United States Patent [19]

Katz

[11] 4,008,731

[45] Feb. 22, 1977

[54] COUNTERBALANCE VALVE

[75] Inventor: Sherwin D. Katz, Skokie, Ill.

[73] Assignee: I-T-E Imperial Corporation, Chicago, Ill.

[22] Filed: Mar. 8, 1971

[21] Appl. No.: 121,784

[52] U.S. Cl. .................................. 137/106; 91/420; 91/447; 137/501

[51] Int. Cl.$^2$ .................... F15B 13/042; G05D 7/00

[58] Field of Search ..................... 91/420, 447, 461; 137/100, 106, 487, 501

[56] References Cited

UNITED STATES PATENTS

| | | | |
|---|---|---|---|
| 2,146,537 | 2/1939 | Farnham | 137/501 |
| 2,644,482 | 7/1953 | McCallum | 137/501 |
| 3,072,107 | 1/1963 | Cassell | 91/447 X |
| 3,198,088 | 8/1965 | Johnson et al. | 91/420 |
| 3,207,177 | 9/1965 | Nevulis | 137/596.2 |
| 3,234,957 | 2/1966 | Allen | 91/461 X |
| 3,272,086 | 9/1966 | Soeters | 137/596.2 X |
| 3,523,490 | 8/1970 | Bianchetta | 91/420 |
| 3,524,386 | 8/1970 | Cudnohufsky | 91/461 |
| 3,543,784 | 12/1970 | Smith | 137/487 X |
| 3,587,393 | 6/1971 | Vick | 91/420 |

FOREIGN PATENTS OR APPLICATIONS

| | | | |
|---|---|---|---|
| 644,545 | 5/1937 | Germany | 91/420 |

*Primary Examiner*—Irwin C. Cohen
*Attorney, Agent, or Firm*—Hofgren, Wegner, Allen, Stellman & McCord

[57] ABSTRACT

A counterbalance valve assembly for controlling the lowering of an actuator driven load including a housing with a passage connected to deliver fluid to or from one side of the actuator. A main pilot-operated lock check valve is provided in this passage to selectively block flow from the actuator when it is desired that the load be held and also to move to an open position permitting return flow from the actuator with the open valve defining an orifice. The speed of the load is controlled by maintaining a constant pressure drop across this orifice with a compensator valve upstream of the main check valve, which serves the purpose of throttling flow from the actuator to the check valve.

10 Claims, 1 Drawing Figure

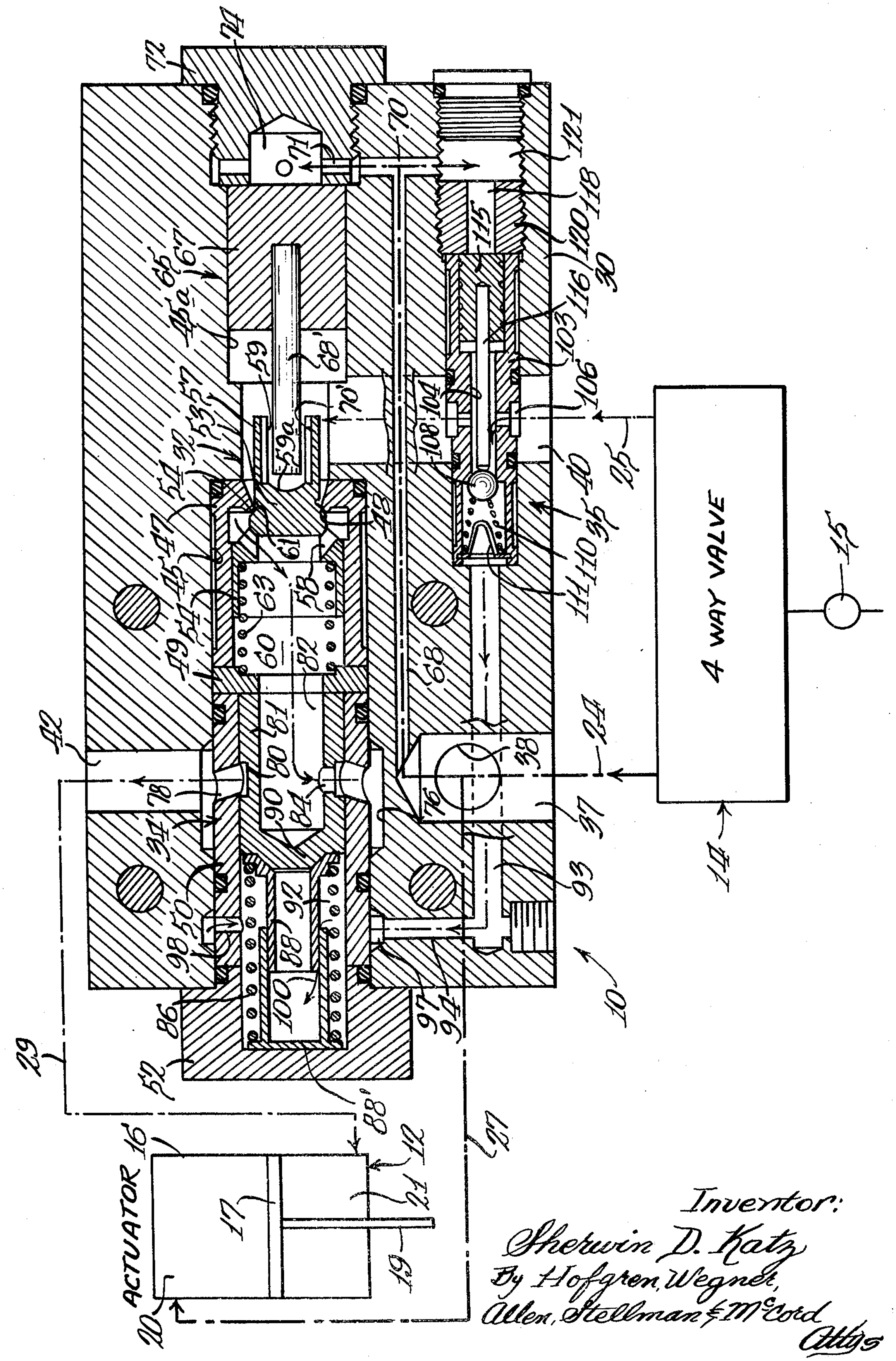
Inventor:
Sherwin D. Katz
By Hofgren, Wegner,
Allen, Stellman & McCord
Attys

COUNTERBALANCE VALVE

BACKGROUND OF THE INVENTION

There have in the past been provided a wide variety of counterbalance holding valves for controlling the flow of fluid relative to a hydraulic actuator. In many applications, such as mobile equipment, reciprocating piston and cylinder actuators are employed for raising and lowering loads under the influence of gravity. Conventionally, four-way valves are provided for selectively porting fluid to either side of the actuator so that the load may be moved in either direction.

In such applications, it has been found that there is a tendency for the load to overrun under the influence of gravity during load lowering, resulting in the too rapid movement of the load and cavitation in the high pressure side of the actuator.

One method of controlling load lowering is a pilot-operated counterbalance valve in the actuator return line that variably restricts flow from the actuator in an attempt to maintain uniform load lowering. These prior counterbalance valves are pilot actuated to an open position by a fluid operable pilot piston that receives fluid from the passage delivering fluid to the load lowering side of the actuator. Thus, as the pressure in the load lowering side of the actuator decreases, indicating a tendency to cavitate and load overrunning, pilot pressure will fall permitting the counterbalance valve to further restrict return flow from the actuator, thereby slowing down the movement of the load.

These prior counterbalance valves have been found to have several disadvantages. They have a tendency to chatter under load fluctuation, they respond slowly to changes in load speed and also require high pilot pressure to maintain the counterbalance valve off its seat since the valve is subjected to full load pressure.

It is the primary object of the present invention to eliminate or minimize the above-described problems in counterbalance valves.

SUMMARY OF THE INVENTION

According to the present invention, a counterbalance valve assembly is provided having a pilot-operated check valve that is free from chattering and requires a much lower pilot pressure than in prior art counterbalance valve constructions. This lock check valve serves the function of blocking return flow from the actuator and holding the load when fluid is not ported from a main four-way valve to the actuator. The check valve also serves the function of providing an orifice for return flow producing a pressure drop.

This pressure drop controls the extent of restriction of a compensator throttling valve upstream of the main check valve. The compensator restricts return flow and maintains a substantially constant pressure drop across the check valve.

Thus the pilot actuator for the lock check valve "sees" a constant valve closing force, and it is not subjected to varying load pressures as in prior art constructions. Moreover, load pressure frequently exceeds the pressure drop across the check valve so that the pilot actuator for the check valve requires a much lesser pressure than in prior art valves where the counterbalance valve was subjected directly to load pressure.

The compensator valve is biased in one direction by fluid upstream of the lock check valve and biased in the other direction by a spring and also fluid pressure on the downstream (return side of the lock check valve. As the load tends to overrun, the pressure drop across the lock check valve increases, providing a greater pressure drop across the compensator valve moving it in a direction further restricting return flow from the actuator thereby reducing load speed, and re-establishing the constant pressure drop across the main lock check valve.

A second pilot-operated check valve is provided for (1) communicating one side of the lock check valve with one side of a piston associated with the compensator valve, (2) locking the compensator piston during load holding, and (3) permitting pressurization of the compensator piston to a position of minimum restriction when fluid is delivered in the opposite direction through the lock check valve to the hydraulic cylinder in a load raising direction.

By removing the load restricting fashion from the pilot-operated lock check valve and effecting this function with a separate compensator valve, valve chattering has been eliminated, pilot pressure requirements have been minimized and the response time of the valve has been greatly decreased.

BRIEF DESCRIPTION OF THE DRAWING

The drawing is a longitudinal section of a counterbalance valve according to the present invention in association with a four-way valve and an actuator (schematically illustrated).

DETAILED DESCRIPTION OF THE PREFERRED EMBODIMENT

Referring to the drawing a counterbalance valve assembly 10 is illustrated interposed between a hydraulic actuator 12 and a four-way valve 14 that selectively ports fluid under pressure from a pump 15 to either side of the actuator to raise or lower a load (not shown) connected thereto. The counterbalance valve provides the general function of controlling movement of the actuator 12 in the load lowering direction.

The actuator 12 is a conventional actuator and includes a cylinder 16 having a piston 17 slidable therein fixed to a piston rod 19 which is adapted to be connected to drive the load. For purposes of explanation, let it be assumed that cylinder chamber 20 when pressurized lowers the load and cylinder chamber 21 when pressurized raises the load.

The four-way valve 14 is conventional and for that reason is shown only schematically in the drawing. A manual operator (not shown) is provided for shifting the valve to selectively connect lines 24 and 25 to either pressure or drain depending upon the position of the valve. When line 24 is pressurized fluid is ported to chamber 20 through line 27, and fluid is exhausted from chamber 21 through line 29, through the counterbalance valve assembly 10 and out line 25 through the four-way valve 14 to tank.

The counterbalance valve assembly 10 includes a generally rectangular housing member 30 containing a pilot-operated lock check valve 32 for selectively holding the load or piston 17 when the four-way valve 14 is in neutral. When open, the valve 32 defines an orifice which produces a pressure drop for controlling a compensator valve 34 coaxially aligned with respect to the lock check valve 32.

The counterbalance assembly also includes a second pilot-operated check valve 35 for (a) communicating one side of the lock check valve with one side of the compensator valve during load lowering (b) holding the compensator valve 34 in its minimum restriction position when the load or piston 17 is locked by check valve 32, and (c) opening and permitting fluid flow to one side of the compensator valve retaining it in its minimum restriction position when line 25 is pressurized.

Housing 30 has a port 37 communicating with line 24. Port 37 intersects port 38 connected by line 27 to the load lowering side of piston 17.

Housing 30 also has another valve port 40, connected to valve line 25, which communicates through lock check valve 32 and compensator valve 34 with actuator port 42 connected to the load raising side of the piston 17 through line 29.

The lock check valve 32 is seated within a stepped through bore 45 in the housing and includes a stationary valve sleeve and seat combination member 47 having a valve seat indicated at 48. The valve sleeve 47 is held in position in bore 45 by annular retaining ring 49, a stationary valve sleeve 50 associated with compensator valve 34, and end cap 52.

Valve sleeve 47 has slidable therein a lock check valve member 53 having an annular skirt portion 54 slidably engaging the interior of sleeve 37, a conical seat engaging portion 54 and an axial pilot projection 57. A plurality of apertures 58 are provided in the valve member 53 so that fluid may flow from valve chamber 60 across the valve seat 48 and out port 40 when the valve member 53 is open. An annular recess 61 is provided in the reduced portion of the valve member 53. Two axial slots 59 having U-shaped ends 59*a* cooperate with seat 48 when the valve member is open to provide an orifice effecting a pressure drop from chamber 60 to the port 40 during load lowering, which pressure drop is employed to control the throttling compensator valve 34 as will appear more clearly hereinbelow.

Return spring 63 is provided in chamber 60 for returning the valve member 53 to its closed position shown in the drawing. It should be understood that the lock check valve 32 is a fail-safe valve in that it will close under the influence of fluid pressure exhausting from actuator chamber 21 even if the spring 63 fails.

A pilot operator 65 is provided for opening the main check valve 53 when port 37 is pressurized by four-way valve 14. Toward this end reduced bore portion 45*a*, aligned with and connected to bore 45, slidably receives a pilot piston 67 having a rod 68' connected thereto and engageable with the bottom of a recess 70' in the valve member projection 57. Piston 67 is actuated by fluid pressure in port 37 through passage 68, passage 70, radial bores 71 in end cap 72 and central bore 74 in the end cap 72. Thus whenever port 37 is pressurized, piston 67 will be driven to the left as shown in the drawing opening the valve member 53 and defining a fixed flow orifice for the return flow from actuator chamber 21 through port 42.

The compensator valve 34 throttles return flow from actuator chamber 21 to provide uniform movement of the piston 17 under load. Valve 34 throttles flow to maintain a constant pressure drop across the orifice defined by lock check valve 32 when it is open. Toward this end the valve bore 45 is provided with enlarged portion 76 communicating with port 42 and with generally radial ports 78 in the valve sleeve 50. Ports 78 variably communicate with an annular recess 80 in a closed ended annular piston 81 having a hollow interior 82 freely communicating with valve chamber 60 associated with lock check valve 32. Annular recess 80 communicates with chamber 82 through radial passages 84.

To bias the compensating piston valve member 81 to its minimum restriction position shown in the drawing, a spring 86 is provided seated at one end on a guide 88' in end cap 52 and engaging at its other end a spring seat 88 which in turn has a conical portion engaging a conical nose 90 on the compensator valve piston 81. Thus in the absence of fluid pressure acting on valve member 81, it will be biased to its minimum restriction position in engagement with annular retainer 49 as shown in the drawing. Guide 88' and spring seat 88 also together form a dash pot subassembly thereby providing additional cushioning for valve piston 81.

The valve member 81 is responsive to the pressure drop across the orifice defined by valve member 32 when opened by pilot piston 67. Toward this end the right side of the piston 81 communicates directly with chamber 60 which represents the pressure on one side of the valve of member 53. The left side of the piston 81, or more particularly chamber 92, communicates with the other side of the compensator valve 32 through radial passage 98 in sleeve 50, annular recess 97, passage 94, intersecting passage 93, pilot-operated check valve 35, and port 40. There is sufficient clearance between retainer 88' and spring seat 88 so that fluid flows therebetween as indicated by arrow 100, subjecting the entire left side of the piston 81 to fluid pressure in port 40 when valve 35 is open. It should be understood that the pressure in chamber 92 on the left side of the compensator valve, when valve 35 is open, is generally atmospheric or drain since during load lowering port 40 is at drain pressure, although drain pressure may go as high as 100 to 200 psi.

With valve 32 open during load lowering, the valve member 81 is thus subjected to the pressure differential across the valve member 32 created by biasing spring 86. By maintaining the pressure differential constant across the valve 32, movement of the load may be very accurately controlled. If the pressure differential across valve member 32 increases, indicating load overrunning, compensator valve member 81 will shift to the left restricting communication between ports 78 and annular recess 80, slowing down the load and reestablishing the predetermined pressure drop across the lock check valve 32.

The pilot-operated valve 35 includes a stationary valve sleeve 103 with a central axial bore 104 communicating with port 40 through radial ports 106. Bore 104 forms at its left end a seat for check valve ball 108 which is biased to its closed position by spring 110 held by retainer 111. Ball 108 is opened either by fluid pressure at ports 106 or by pilot piston 115 which carries a pilot rod 116 directly engageable with ball 108.

Piston 115 is subjected to fluid under pressure through bore 118 in retainer plug 120, chamber 121, passage 70, passage 68 and port 37. Thus, whenever port 37 is pressurized, the pilot piston 115 will shift to the left opening valve 35.

To raise the piston 17 in actuator 12, the four-way valve 14 is shifted to a position pressurizing line 25 and connecting line 24 to drain. The fluid under pressure will be delivered through port 40, opening check valve member 53 against the force of spring 63, passing through chamber 60, bore 82, ports 78, and load port 42 passing through line 29 to the lower side chamber 21. Fluid under pressure in port 40 and ports 106 also opens check ball 108 pressurizing chamber 92 on the left side of the compensator valve member 81 maintaining the valve member in its position of minimum flow restriction when raising the load. Fluid exhausting from actuator chamber 20 flows through line 27, into port 38, passes out port 37 and through valve 14 to tank. Piston 17 thus moves upwardly.

To hold the piston 17 in a fixed position, the four-way valve 14 is moved to neutral depressurizing both lines 24 and 25. Any tendency for the piston 17 to lower under load increases the pressure in chamber 21, port 42 and valve chamber 60. The force of fluid pressure in chamber 60 urges valve member 53 tightly to its closed position against seat 48 blocking any return flow from chamber 21. In this manner, the piston 17 is locked from lowering movement. In the holding position, the compensator valve piston 81 is maintained in its right position, providing minimum flow restrictions since fluid is prevented from leaving chamber 92 by the closure of the pilot-operated check valve 35.

To lower the load, the operator shifts the four-way valve 14 to a position pressurizing line 24 and connecting line 25 to drain. Fluid flows from line 24, through housing 30 and out port 38 to the actuator chamber 20 pressurizing the topside of piston 17. The piston then begins downward movement with fluid exhausting from chamber 21, through line 29, into port 42, through the compensator valve 34, through ports 58 in valve member 53 which is open under pilot pressure, and out port 40 to the directional control valve 14.

During load lowering, the valve member 53 is pilot-operated to its open position by the pressurization of bore 74 on the right side of the piston 67 by line pressure in port 37 as seen through passages 68 and 70. If the piston begins moving under load at a faster rate than fluid is delivered to chamber 20, a load overrunning condition exists which may produce some cavitation in chamber 20. Under these conditions, increased pressure seen in chamber 60 by valve member 81 shifts the valve member to the left against the force of biasing spring 86 and fluid pressure in chamber 92. At this time, the fluid pressure in chamber 92 is at the same value as the pressure in port 40 since check valve 35 is pilot-operated from its seat. Thus, valve member 81 is positioned by the differential pressure across valve member 53.

The movement of valve member 81, throttling return flow through port 42 to port 40, reestablishes a predetermined pressure drop across the orifice defined by the valve member 32 when open under pilot operation. During load lowering the valve member 81 shifts as required to maintain this pressure drop across valve member 53.

I claim:

1. A counterbalance holding valve assembly comprising: passage means defining a fluid flow path, a check valve member in said passage means for blocking flow in one direction therein, pilot-operated means for opening said valve member, valve means in said passage means for maintaining the pressure drop across the valve member substantially constant, and means responsive to the pressure drop across the valve member for controlling said valve means.

2. A counterbalance holding valve assembly comprising: passage means defining a fluid flow path, a check valve member in said passage means for blocking flow in one direction therein, pilot-operated means for opening said valve member, and throttling valve means for maintaining the flow across said valve member substantially constant, said throttling valve being responsive to the pressure drop across the valve member.

3. A counterbalance holding valve comprising: passage means defining a fluid flow path, a pilot-operated check valve in said passage means for selectively blocking flow in one direction through said passage means, said valve defining a fixed orifice when the valve is open, and means for controlling the pressure drop across the valve including a throttling valve in said passage means upstream of said pilot-operated valve, said throttling valve being responsive to the pressure drop across the orifice and providing an increased restriction to flow in said passage means in response to an increase in flow in said passage means to maintain a constant flow across said orifice valve.

4. A counterbalance holding valve according to claim 3, wherein said throttling valve maintains a substantially constant pressure drop across said orifice.

5. A counterbalance holding valve according to claim 3, wherein said pilot-operated valve includes a pilot piston and a fluid chamber for moving said piston when pressurized, second passage means for selectively delivering fluid under pressure, said pilot chamber being connected to be pressurized by fluid in said second passage means.

6. A counterbalance holding valve comprising: passage means defining a fluid flow path, a pilot-operated valve in said passage means for selectively blocking fluid flow through said passage means, said valve defining a fixed orifice when the valve is open, a throttling valve in said passage means upstream of said pilot-operated valve, said throttling valve being responsive to the pressure drop across the orifice and providing an increased restriction to flow in said passage means in response to an increase in pressure drop across the orifice, said throttling valve including a generally cylindrical piston having a first fluid chamber on one side thereof and a second fluid chamber on the other side thereof, means communicating the first fluid chamber with one side of said orifice, and said second fluid chamber with the other side of said orifice.

7. A counterbalance holding valve according to claim 6 including a spring in said first chamber biasing said cylindrical piston to a position of minimum restriction.

8. A counterbalance holding valve comprising: passage means defining a fluid flow path, a pilot-operated valve in said passage means for selectively blocking fluid flow through said passage means, said valve defining a fixed orifice when the valve is open, a throttling valve in said passage means upstream of said pilot-operated valve, said throttling valve being responsive to the pressure drop across the orifice and providing an increased restriction to flow in said passage means in response to an increased restriction to flow in said passage means in response to an increase in pressure drop across the orifice, said throttling valve including a generally cylindrical piston having a first fluid chamber on one side thereof and a second fluid chamber on the other side thereof, means communicating the first fluid chamber with one side of said orifice, and said second fluid chamber with the other side of said orifice, said means communicating said first chamber with said one side of said orifice including a passage, a second pilot-operated check valve in said passage for blocking flow from said first chamber when the first pilot-operated valve in said passage means is blocking flow through said passage means.

9. A counterbalance holding valve according to claim 8, including second passage means for delivering hydraulic fluid, said first and second pilot-operated check valves being connected to be actuated by fluid pressure in said second passage means.

10. A counterbalance holding valve assembly comprising: first passage means defining a first hydraulic fluid flow path, second passage means defining a second hydraulic fluid flow path, a pilot-operated check valve in said first passage means, said pilot-operated check valve opening in response to fluid under pressure in the first passage means, said pilot-operated check valve opening in response to fluid under pressure in said second passage means and defining a fixed orifice, said check valve closing blocking flow when fluid is not delivered to either said first and second passage means, a compensator valve in said passage means axially aligned with said check valve for throttling flow through said orifice, said compensator valve being responsive to the pressure drop across said orifice to throttle flow through said first passage means and maintaining a constant flow through said orifice, spring means biasing said compensator valve in a direction providing minimum restriction to flow in said first passage means, said compensator valve including a cylindrical piston having first and second actuating chambers on the opposite sides thereof, said first chamber communicating with the downstream return side of said orifice, a second pilot-operated check valve in said first passage means, said second check valve being pilot-operated to an open position in response to fluid pressure delivered through said second passage means, said second pilot-operated check valve closing and preventing flow from said second actuating chamber when neither of said first or second passage means are delivering fluid, said second check valve opening when the first passage means is delivering fluid and thereby pressurizing said second actuating chamber and placing the compensator valve in a position of minimum restriction.

* * * * *